March 31, 1953 — D. H. SAMUELSON — 2,632,955

APPARATUS FOR CHECKING RECESSES IN RECESSED HEAD SCREWS

Filed July 7, 1949

INVENTOR.
DAVID H. SAMUELSON
BY Hudson, Boughton,
Williams, David & Hoffmann.
ATTORNEYS Patented Mar. 31, 1953

2,632,955

UNITED STATES PATENT OFFICE 2,632,955

APPARATUS FOR CHECKING RECESSES IN RECESSED HEAD SCREWS

David H. Samuelson, Lyndhurst, Ohio, assignor to The National Screw & Manufacturing Company, Cleveland, Ohio, a corporation of Ohio Application July 7, 1949, Serial No. 103,386

2 Claims. (Cl. 33—172)

The present invention relates to a method and apparatus for checking the accuracy of recesses such as those employed in recessed head screws.

In manufacturing many articles having recesses therein and especially recessed head screws, it is important that the recesses be formed within precise limits. This is particularly true of the recesses of recessed head screws, such as the so-called "Phillips" screw, otherwise the recesses will not properly receive the bit of the screw driving tool.

One of the principal objects of the present invention is the provision of a new and improved method and apparatus for checking the accuracy of recesses and especially recesses of recessed head screws, which method includes the use of a mechanical movement measuring mechanism, such as a dial indicator, whereby variable factors, such as human judgment are not involved in the checking operation.

Another object of the invention is the provision of a method of checking the accuracy of recesses and especially recesses in recessed head screws which comprises providing a member having a form complementary or conforming in all respects to the form of a correct recess, complementally inserting the member into a recess to be checked, and measuring the penetration of the member into the recess by a movement measuring indicator.

Another object of the invention is the provision of an apparatus for gauging or checking recesses and especially recesses in the heads of screws, which apparatus comprises a sleeve-like member having a stem projecting therefrom and slidable therein and means for indicating the relative position of the sleeve-like member and stem, the projecting end of the stem being formed complementary to the correct recess to be checked.

A further object of the invention is the provision of an apparatus for gauging or checking recesses and especially recesses in the heads of screws, which apparatus comprises a sleeve-like member adapted to receive the stem of a movement indicator, and having therein a slidable member engageable at one end with the plunger of the movement indicator and the other end projecting from the sleeve and formed complementary to the correct recess to be checked.

The invention resides in certain steps of process, constructions and combinations and arrangements of parts and further objects and advantages will be apparent to those skilled in the art to which it relates from the following description of the preferred embodiment described with reference to the accompanying drawings forming a part of this specification, in which Fig. 1 is an elevational end view of a recessed head screw;

In general, the invention contemplates the checking of the accuracy of formed recesses and more particularly recesses in screw heads by inserting a member into the recess to be checked, which member is complementary in all respects to a correctly formed recess, and measuring the penetration of the member into the recess. If the penetration is less than a given minimum, the recess is malformed in one or more respects.

The preferred apparatus for carrying out the invention comprises a sleeve adapted to receive the stem of a movement indicator, such as, a conventional dial indicator. The sleeve is provided with a member reciprocable therein, one end of which member is engageable with the plunger of the indicator and the other end projects from the sleeve. The projecting end of the member is formed complementary and conforming in all respects to a correct recess similar to that to be checked and it may be easily inserted into a correctly formed recess. In the preferred form of the invention, the stem of the movement indicator is detachably secured in the sleeve, and the end of the sleeve from which the member projects has knife edge formations for engagement with the surface adjacent to the recess to be checked.

Figure 4:
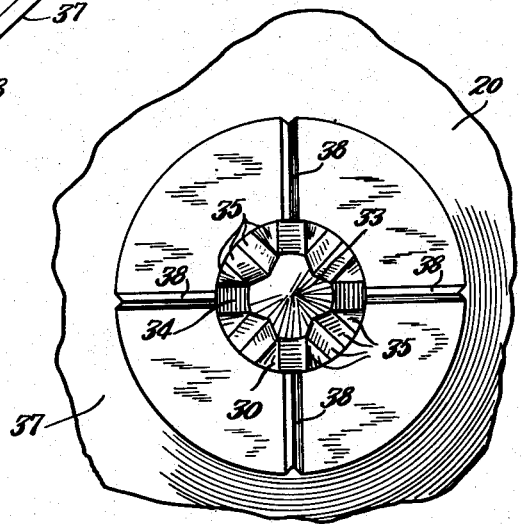
Fig. 4 is a fragmentary end view of the gauge shown in Fig. 2, but on a larger scale.

The invention is not limited to the checking of recesses of any particular form, but as previously stated, is particularly applicable to the checking of recesses in recessed head screws, especially those of the so-called "Phillips" screw and is herein shown and described merely for purposes of illustration as applied to the checking of such screws. Referring to the drawings the recessed head screw S shown is similar to that shown in Figs. 4 and 5 of Phillips Patent No. 2,046,837. The screw includes the usual threaded shank 11 having a head 12 which is provided with a punched splined recess 13, the mouth of which is generally in the form of a star or cross with the splines at the points thereof and extending inwardly and sloping toward the axis of the screw. Four walls 14 of the splines of the recess slope inwardly to the bottom wall 15 of the recess which slopes more gradually to the center thereof. Wall sections 16 of the recess are disposed angularly to one another intermediate the walls 14 and they taper inwardly slightly to the bottom wall. It is essential that the recess be of a minimum depth and that the walls of the recess have precise angular relationships, otherwise the bit of the screw driver tool which is precisely formed for cooperation with the walls of the recess cannot be drivingly connected with the screw head as intended. At times the punch for forming the recesses becomes worn or damaged during manufacturing operations and the recesses will not be formed properly. In some cases a part of the recess opening may be formed narrower than required, the angular relationship between one or more walls may not be correct or the recess may not be deep enough.

Figure 1:
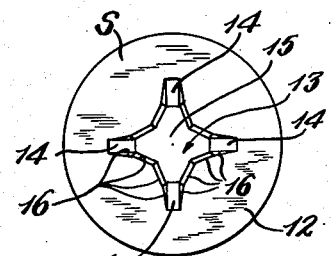
Figure 2:
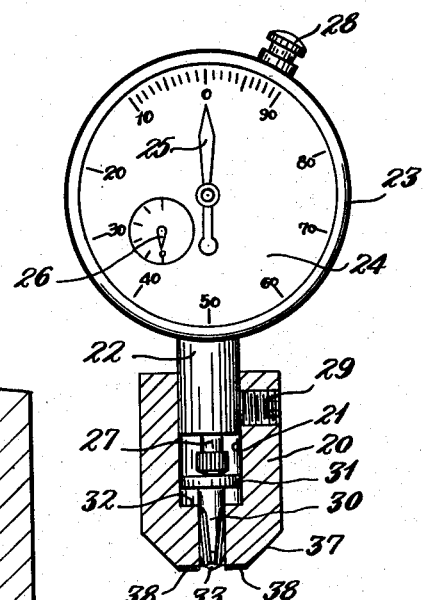
Fig. 2 is a view, partly in section, of a gauge for checking the configurations of recesses in recessed head screws.

A gauge for checking the recesses of screws similar to screw S and embodying the present invention is shown in Fig. 2. The gauge comprises a sleeve 20 having a bore 21, the upper counterbored end of which is adapted to receive the stem 22 of a movement indicator 23. The indicator 23 shown is of the one-half inch dial type and may be one of several commercially available. The indicator includes a dial 24 having suitably arranged indicia and pointers 25, 26 actuated through suitable gear train mechanism by movement of a plunger 27 which projects from the stem 22 and which is normally urged outwardly. The pointer 25 of the movement indicator is preferably capable of indicating movements as small as one-thousandths of an inch, and provision is made for adjusting the pointer to zero reading for different positions of the plunger 27 relative to the sleeve. In the indicator shown, zero adjustments may be made by a knob 28. The indicator stem 22 is adapted to be releasably and adjustably secured in the sleeve 20 by a set screw 29 which is threaded in an opening in the side of the sleeve.

The sleeve 20 is provided with a member 30 reciprocable in the lower section of the bore 21, which section is of reduced diameter with respect to that of the upper section of the bore and forms a guide for the member 30. The upper end of the member 30 has a head 31 which is adapted to be engaged by the plunger 27 of the indicator 23. The head 31 of the member 30 is slidable in the lower end of the upper section of the bore 21. Movement of the member 30 outwardly of the lower end of the sleeve, as seen in Fig. 2, is limited by the head 31 engaging a shoulder 32 formed by the reduction in diameter of the lower section of the bore 21. The member 30 may be removed from the sleeve through the upper end of the sleeve after removal of the indicator stem 22.

Figure 3:
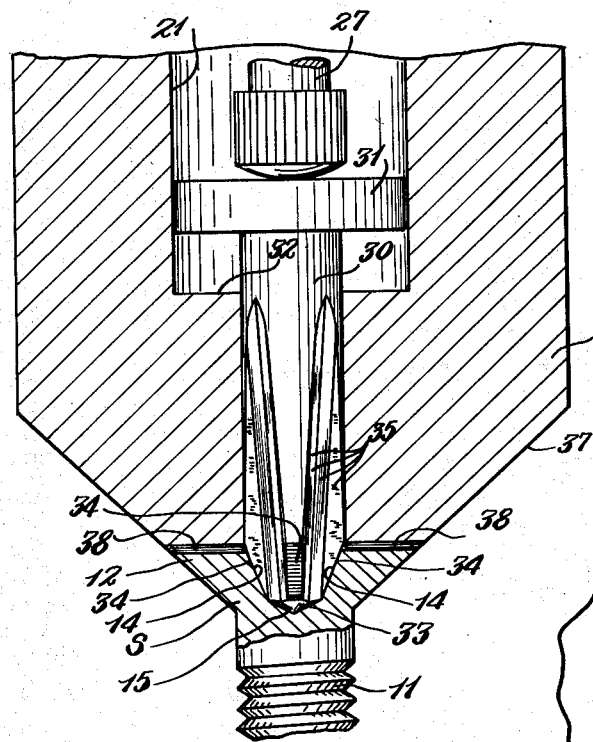
Fig. 3 is a fragmentary view, partly in section, of a portion of the gauge shown in Fig. 2, but on a larger scale, and a recessed head screw against the gauge in a position to check the recess thereof.

The lower end of the member 30 is formed substantially complementary in all respects to the correct form for the recesses of screws corresponding to recess 13, and this portion of the member is adapted to project from the sleeve for insertion in the recesses to be checked of screw heads placed against the lower end of the sleeve, as seen in Fig. 3. The form of the member is like that of a correct punch for forming the recesses and in the form of the invention here shown, the lower tip end of member 30 has a blunt tapered end portion 33 which corresponds to the bottom wall 15 of the recess 13 and four ribs or vanes 34 which correspond to the splines 14 of the recess. The portions intermediate the vanes each include contiguous surfaces 35, which correspond to walls 16, respectively, of the recess and when the member 30 is inserted into a properly formed recess to be checked, the corresponding surfaces of the member and recess engage one another. On the other hand, if the recess checked is too shallow or the walls of the recess are closer to one another than is proper, the member cannot penetrate the recess to the full extent.

Preferably, the lower end of the sleeve 20, as seen in Fig. 2, is tapered as at 37 and the end surface has four ridges or knife edges 38 which extend radially with respect to the opening of the bore 21. The knife edges 38 provide accurately formed reference points or surfaces against which the head of a recessed head screw may be placed in a definite, predetermined position relative to the plunger 27. As shown, the knife edges 38 lie in a plane since the gauge shown is designed for checking flat-headed screws. It is to be understood, however, that the lower end of the sleeve 20 including the knife edges 38 should conform to the surface adjacent to the recess which it is desired to check. If the recess to be checked is that of a round-headed screw, for example, the knife edges 38 would be arcuate-shaped to conform to the curved head of the screw.

In checking a recess in the head of a screw, the outer end of the member 30 is inserted complementally into the recess of the screw head, that is to say, the vanes 34 are aligned with the respective end walls 14 of the recess, and the end of the sleeve having the knife edges 38, is engaged against the screw head, as seen in Fig. 3. It will be apparent that should any part of a recess checked be narrower or shallower than a correct recess, the member 30 cannot penetrate into the screw as deep as if the recess were properly formed. For example, if the two walls at the opposite sides of one of the walls 14 were narrower than normal, the vane 34 aligned with the mentioned wall 14 could not enter between the walls. The depth of penetration of the member 30 is precisely indicated by the pointers 25, 26 cooperating with the indicia on dial 24 according to the position of the plunger 27. By setting the pointers to zero position when the lower end of member 30 is flush with the knife edges 38, as seen in Fig. 2, the plunger causes the pointer to register the exact penetration of the member into the recess. The pointers 25, 26 can be readily set to zero position by using the adjustments 28, 29. A rough adjustment can be obtained if desired by moving the stem 22 in the sleeve 20 upon the screw 29 being released and the final adjustment by turning the knob 28. The minimum penetration consistent with satisfactory reception of a screw driver tool can easily be ascertained and any indication short of the minimum will be notice that the recess in a particular screw being tested is defective in one respect or another.

To check screws having recesses of other configurations, members similar to member 30 but having the projecting end shaped to conform with the particular recess to be checked, can be substituted therefor in the sleeve 20. The member 30, and those similar thereto, may be removed and replaced through the upper end of the bore 21 of the sleeve by first removing the stem 22 of the movement indicator from the bore of the sleeve.

As an alternative construction, the sleeve 20 may be omitted and the plunger 27 may have its outer end formed complementary in all respects to a precisely formed recess to be checked. In this event, the end surface of the stem may have knife edges corresponding to those on sleeve 20 to provide accurate reference points against which the work to be checked is placed to indicate the depth of penetration.

It will be apparent that the invention provides an accurate method for checking the form or contours of recesses and materially increases the rate and accuracy of inspection or checking over prior methods. The apparatus of the invention is inexpensive, convenient and it may be used to check many different sizes and shapes of recessed screw heads merely by the substitution of one gauge member for another.

While the preferred form of the invention has been described in considerable detail, it will be apparent that the invention is not limited to the constructions shown and it is my intention to cover hereby all adaptations, modifications and changes therein which come within the practice of those skilled in the art to which the invention relates and the scope of the appended claims.

Having thus described my invention, I claim:

1. Apparatus for checking the accuracy of the configuration of a recess having splined sides comprising, a sleeve adapted to receive the stem of a movement indicator in one end thereof, the other end of said sleeve being adapted to engage the member in which the recess to be checked is formed adjacent to the mouth of the recess, a member slidable in said sleeve and having an end extendible through the last-named end of said sleeve, said end of said member having a configuration conforming to the desired shape of the recess to be checked including ribs adapted to conform to the splines of an accurate recess, the opposite end of said member being adapted to engage with the plunger of a movement indicator having its stem in said sleeve, and means for limiting movement of said member outwardly through said last-named end of said sleeve.

2. Apparatus for checking the accuracy of the configuration of a recess having splined sides comprising, a sleeve adapted to receive the stem of a movement indicator in one end thereof, the other end of said sleeve being adapted to engage the member in which the recess to be checked is formed, the last mentioned end of said sleeve having knife edges to engage the surface of the member in which the recess is formed, means for releasably securing the stem of the movement indicator in the first-named end of said sleeve, a member slidable in said sleeve and having an end extendible through the last-named end of said sleeve, said end of said member having a configuration including longitudinally extending ribs conforming to the desired shape of the recess to be checked, the opposite end of said member being adapted to engage with the plunger of the movement indicator having its stem in said sleeve, and means for limiting movement of said member outwardly through said other end of said sleeve.

DAVID H. SAMUELSON.

REFERENCES CITED

The following references are of record in the file of this patent:

UNITED STATES PATENTS

| Number | Name | Date |
| --- | --- | --- |
| 1,647,552 | Tangring | Nov. 1, 1927 |
| 1,757,313 | Kaufman | May 6, 1930 |
| 1,856,944 | Blomstrom | May 3, 1932 |
| 2,046,838 | Phillips | July 7, 1936 |
| 2,306,489 | Mortensen | Dec. 29, 1942 |
| 2,357,024 | Robins | Aug. 29, 1944 |

FOREIGN PATENTS

| Number | Country | Date |
| --- | --- | --- |
| 587,175 | Great Britain | Apr. 16, 1947 |